United States Patent
Wang et al.

(10) Patent No.: US 10,721,320 B2
(45) Date of Patent: Jul. 21, 2020

(54) REDIRECTION METHOD, APPARATUS, AND SYSTEM

(71) Applicant: Huawei Technologies Co., Ltd., Shenzhen, Guangdong (CN)

(72) Inventors: Shuxiang Wang, Beijing (CN); Hongliang Gao, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 253 days.

(21) Appl. No.: 15/675,661

(22) Filed: Aug. 11, 2017

(65) Prior Publication Data

US 2017/0366636 A1  Dec. 21, 2017

Related U.S. Application Data

(63) Continuation of application No. PCT/CN2016/073507, filed on Feb. 4, 2016.

(30) Foreign Application Priority Data

Feb. 13, 2015 (CN) .......................... 2015 1 0080975

(51) Int. Cl.
*H04L 29/08* (2006.01)
*H04L 29/06* (2006.01)

(52) U.S. Cl.
CPC .......... *H04L 67/2814* (2013.01); *H04L 29/06* (2013.01); *H04L 29/08* (2013.01);
(Continued)

(58) Field of Classification Search
None
See application file for complete search history.

(56) References Cited

U.S. PATENT DOCUMENTS 8,549,157 B2 * 10/2013 Schnellbaecher ... H04L 63/0281
709/229
8,645,696 B2 * 2/2014 Schneider ............ H04L 63/166
713/156
(Continued)

FOREIGN PATENT DOCUMENTS

CN    101360102 A    2/2009
CN    102334311 A    1/2012
(Continued)

OTHER PUBLICATIONS

Dierks et al., "The Transport Layer Security (TLS) Protocol; Version 1.2", Network Working Group Request for Comments 5246, Aug. 2008, 104 pages.
(Continued)

*Primary Examiner* — Kambiz Zand
*Assistant Examiner* — Arezoo Sherkat
(74) *Attorney, Agent, or Firm* — Womble Bond Dickinson (US) LLP (57) ABSTRACT

The present application provides a redirection method, apparatus, and system, to increase a redirection success rate. In the method, a broadband remote access server (BRAS) receives a first Transport Layer Security (TLS) handshake packet sent by a terminal, where the first TLS handshake packet carries a flag and an identifier of the terminal, and the flag is used to indicate that the terminal is capable of performing redirection according to a uniform resource locator (URL); after determining that the first TLS handshake packet carries the flag, the BRAS obtains a URL of a destination server and a certificate of the destination server according to the identifier of the terminal, where the destination server is a server that redirection is destined for; and the BRAS sends the URL of the destination server and the certificate of the destination server to the terminal.

9 Claims, 6 Drawing Sheets

(52) U.S. Cl.
CPC ............ *H04L 63/166* (2013.01); *H04L 67/02* (2013.01); *H04L 67/146* (2013.01); *H04L 67/42* (2013.01); *H04L 63/0823* (2013.01)

(56) References Cited

U.S. PATENT DOCUMENTS

| | | | |
|---|---|---|---|
| 8,738,902 B2* | 5/2014 | Yoo | H04L 63/0823 |
| | | | 713/156 |
| 9,015,469 B2* | 4/2015 | Prince | H04L 63/0823 |
| | | | 713/153 |
| 9,419,942 B1* | 8/2016 | Buruganahalli | H04L 63/0227 |
| 9,930,067 B1* | 3/2018 | Johansson | H04L 63/166 |
| 10,237,078 B2* | 3/2019 | Prince | H04L 63/0823 |
| 10,255,445 B1* | 4/2019 | Brinskelle | G06F 21/606 |
| 2008/0263215 A1* | 10/2008 | Schnellbaecher | H04L 63/0281 |
| | | | 709/229 |
| 2009/0037997 A1 | 2/2009 | Agbabian et al. | |
| 2010/0131766 A1* | 5/2010 | Schneider | H04L 63/0823 |
| | | | 713/175 |
| 2010/0218248 A1 | 8/2010 | Nice et al. | |
| 2012/0174196 A1* | 7/2012 | Bhogavilli | H04L 63/1458 |
| | | | 726/5 |
| 2013/0061281 A1 | 3/2013 | Pao et al. | |
| 2014/0344908 A1* | 11/2014 | Rizzo | H04L 67/2814 |
| | | | 726/6 |
| 2014/0351573 A1* | 11/2014 | Martini | H04L 63/0428 |
| | | | 713/153 |
| 2015/0195370 A1* | 7/2015 | Hu | H04L 67/2814 |
| | | | 709/203 |
| 2016/0057141 A1* | 2/2016 | Van Den Broeck | |
| | | | H04L 9/3268 |
| | | | 726/10 |
| 2017/0063929 A1* | 3/2017 | Burbridge | H04L 61/1511 |

FOREIGN PATENT DOCUMENTS

| | | | |
|---|---|---|---|
| CN | 102710667 A | | 10/2012 |
| CN | 103051626 A | | 4/2013 |
| CN | 103384993 A | | 11/2013 |
| CN | 103701760 A | * | 4/2014 |
| CN | 104270405 A | | 1/2015 |
| EP | 2020798 A2 | | 2/2009 |
| EP | 2991319 A1 | | 3/2016 |
| WO | WO-2013112389 A1 | * | 8/2013 |

OTHER PUBLICATIONS

Rescorla et al., "The Secure HyperText Transfer Protocol", Network Working Group Request for Comments 2660, Aug. 1999, 45 pages.

Yee, "Updates to the Internet X.509 Public Key Infrastructure Certificate and Certificate Revocation List (CRL) Profile", Internet Engineering Task Force (IETF) Request for Comments 6818, Jan. 2013, 8 pages.

* cited by examiner

REDIRECTION METHOD, APPARATUS, AND SYSTEM

CROSS-REFERENCE TO RELATED APPLICATIONS

This application is a continuation of International Application No. PCT/CN2016/073507, filed on Feb. 4, 2016, which claims priority to Chinese Patent Application No. 201510080975.4, filed on Feb. 13, 2015. The disclosures of the aforementioned applications are hereby incorporated by reference in their entireties.

TECHNICAL FIELD

The present application relates to the field of communications technologies, and in particular, to a redirection method, apparatus, and system.

BACKGROUND

For a broadband remote access server (BRAS), there are various scenarios in which access of a terminal to a World Wide Web (web) page needs to be redirected to an operator server.

For example, when the terminal accesses an arbitrary website, a destination address of the arbitrary website is not a web server of an operator. In this case, the access of the terminal is redirected by the BRAS to a web authentication page of the operator, that is, the web server of the operator performs web authentication on the terminal. However, currently, before the access of the terminal is redirected by the BRAS to the web authentication page of the operator, because a certificate obtained by the terminal from the BRAS does not match the website that the terminal intends to access, the terminal outputs alarm information prompting of a certificate problem. As a result, a user who uses the terminal closes a page that includes the alarm information. Consequently, the access of the terminal cannot be successfully redirected by the BRAS to the web authentication page of the operator, and therefore, the terminal cannot implement a service corresponding to redirection.

SUMMARY

Embodiments of the present application provide a redirection method, apparatus, and system, to help increase a redirection success rate.

Specific technical solutions provided by the embodiments of the present application are as follows.

According to a first aspect, a redirection method is provided, including:

receiving, by a BRAS, a first Transport Layer Security (TLS) handshake packet sent by a terminal, where the first TLS handshake packet carries a flag and an identifier of the terminal, and the flag is used to indicate that the terminal is capable of performing redirection according to a uniform resource locator (URL);

obtaining, by the BRAS, a URL of a destination server and a certificate of the destination server according to the identifier of the terminal after determining that the first TLS handshake packet carries the flag, where the destination server is a server that redirection is destined for; and sending, by the BRAS, the URL of the destination server and the certificate of the destination server to the terminal.

In a first possible implementation of the first aspect, the obtaining, by the BRAS, a URL of a destination server and a certificate of the destination server according to the identifier of the terminal includes:

obtaining, by the BRAS, a preconfigured entry according to the identifier of the terminal, where the entry includes the identifier of the terminal, the URL of the destination server, and the certificate of the destination server; and obtaining, by the BRAS, the URL of the destination server and the certificate of the destination server from the entry.

With reference to the first aspect or the first possible implementation of the first aspect, a second possible implementation of the first aspect is further provided, where the sending, by the BRAS, the URL of the destination server and the certificate of the destination server to the terminal includes:

sending, by the BRAS, a second TLS handshake packet to the terminal, where the second TLS handshake packet carries the URL of the destination server and the certificate of the destination server.

With reference to the first aspect or the first possible implementation of the first aspect, a third possible implementation of the first aspect is further provided, where the sending, by the BRAS, the URL of the destination server and the certificate of the destination server to the terminal includes:

sending, by the BRAS, a server redirect packet to the terminal, where the server redirect packet carries the URL of the destination server; and sending, by the BRAS, a server certificate packet to the terminal, where the server certificate packet carries the certificate of the destination server.

With reference to the first aspect, the first possible implementation of the first aspect, the second possible implementation of the first aspect, or the third possible implementation of the first aspect, a fourth possible implementation of the first aspect is further provided, where the method further includes:

receiving, by the BRAS, a first HTTPS packet sent by the terminal, where the first HTTPS packet is used to request redirection information from the BRAS, and the first HTTPS packet includes the identifier of the terminal;

obtaining, by the BRAS, the URL of the destination server according to the identifier of the terminal; and sending, by the BRAS, a second HTTPS packet to the terminal, where the second HTTPS packet includes the URL of the destination server.

According to a second aspect, a redirection method is provided, including:

sending, by a terminal, a first TLS handshake packet to a BRAS, where the first TLS handshake packet carries a flag and an identifier of the terminal, and the flag is used to indicate that the terminal is capable of performing redirection according to a URL;

receiving, by the terminal, a URL of a destination server and a certificate of the destination server that are sent by the BRAS, where the destination server is a server that redirection is destined for;

determining, by the terminal, whether the URL of the destination server matches the certificate of the destination server; and outputting, by the terminal, first prompt information if the URL of the destination server matches the certificate of the destination server, where the first prompt information is used to prompt that access is to be redirected, and the access is access of the terminal to a requested server.

In a first possible implementation of the second aspect, the method further includes:

outputting, by the terminal, second prompt information if the URL of the destination server does not match the certificate of the destination server, where the second prompt information is used to prompt that the certificate of the destination server is incorrect.

With reference to the second aspect or the first possible implementation of the second aspect, a second possible implementation of the second aspect is further provided, where the receiving, by the terminal, a URL of a destination server and a certificate of the destination server that are sent by the BRAS includes:

receiving, by the terminal, a second TLS handshake packet sent by the BRAS, where the second TLS handshake packet carries the URL of the destination server and the certificate of the destination server; and obtaining, by the terminal, the URL of the destination server and the certificate of the destination server from the second TLS handshake packet.

With reference to the second aspect or the first possible implementation of the second aspect, a third possible implementation of the second aspect is further provided, where the receiving, by the terminal, a URL of a destination server and a certificate of the destination server that are sent by the BRAS includes:

receiving, by the terminal, a server redirect packet sent by the BRAS, where the server redirect packet carries the URL of the destination server;

obtaining, by the terminal, the URL of the destination server from the server redirect packet;

receiving, by the terminal, a server certificate packet sent by the BRAS, where the server certificate packet carries the certificate of the destination server; and obtaining, by the terminal, the certificate of the destination server from the server certificate packet.

With reference to the second aspect, the first possible implementation of the second aspect, the second possible implementation of the second aspect, or the third possible implementation of the second aspect, a fourth possible implementation of the second aspect is further provided, where the method further includes:

sending, by the terminal, a first HTTPS packet to the BRAS, where the first HTTPS packet is used to request redirection information from the BRAS, and the first HTTPS packet includes the identifier of the terminal;

receiving, by the terminal, a second HTTPS packet sent by the BRAS, where the second HTTPS packet includes the URL of the destination server; and accessing, by the terminal, the destination server according to the URL of the destination server after obtaining an instruction used to instruct that redirection is to be performed.

According to a third aspect, a BRAS is provided, where the BRAS includes:

a receiving module, configured to receive a first TLS handshake packet sent by a terminal, where the first TLS handshake packet carries a flag and an identifier of the terminal, and the flag is used to indicate that the terminal is capable of performing redirection according to a URL;

an obtaining module, configured to obtain a URL of a destination server and a certificate of the destination server according to the identifier of the terminal after it is determined that the first TLS handshake packet carries the flag, where the destination server is a server that redirection is destined for; and a sending module, configured to send the URL of the destination server and the certificate of the destination server to the terminal.

In a first possible implementation of the third aspect, the obtaining module is specifically configured to obtain a preconfigured entry according to the identifier of the terminal, where the entry includes the identifier of the terminal, the URL of the destination server, and the certificate of the destination server; and the obtaining module is specifically configured to obtain the URL of the destination server and the certificate of the destination server from the entry.

With reference to the third aspect or the first possible implementation of the third aspect, a second possible implementation of the third aspect is further provided, where the sending module is specifically configured to send a second TLS handshake packet to the terminal, where the second TLS handshake packet carries the URL of the destination server and the certificate of the destination server.

With reference to the third aspect or the first possible implementation of the third aspect, a third possible implementation of the third aspect is further provided, where the sending module is specifically configured to send a server redirect packet to the terminal, where the server redirect packet carries the URL of the destination server; and the sending module is specifically configured to send a server certificate packet to the terminal, where the server certificate packet carries the certificate of the destination server.

With reference to the third aspect, the first possible implementation of the third aspect, the second possible implementation of the third aspect, or the third possible implementation of the third aspect, a fourth possible implementation of the third aspect is further provided, where the receiving module is further configured to receive a first HTTPS packet sent by the terminal, where the first HTTPS packet is used to request redirection information from the BRAS, and the first HTTPS packet includes the identifier of the terminal;

the obtaining module is further configured to obtain the URL of the destination server according to the identifier of the terminal; and the sending module is further configured to send a second HTTPS packet to the terminal, where the second HTTPS packet includes the URL of the destination server.

According to a fourth aspect, a terminal is provided, including:

a sending module, configured to send a first TLS handshake packet to a BRAS, where the first TLS handshake packet carries a flag and an identifier of the terminal, and the flag is used to indicate that the terminal is capable of performing redirection according to a URL;

a receiving module, configured to receive a URL of a destination server and a certificate of the destination server that are sent by the BRAS, where the destination server is a server that redirection is destined for;

a determining module, configured to determine whether the URL of the destination server matches the certificate of the destination server; and an output module, configured to output first prompt information if the determining module determines that the URL of the destination server matches the certificate of the destination server, where the first prompt information is used to prompt that access is to be redirected, and the access is access of the terminal to a requested server.

In a first possible implementation of the fourth aspect, the output module is further configured to output second prompt information if the determining module determines that the URL of the destination server does not match the certificate of the destination server, where the second prompt information is used to prompt that the certificate of the target server is incorrect.

With reference to the fourth aspect or the first possible implementation of the fourth aspect, a second possible implementation of the fourth aspect is further provided, where the receiving module is specifically configured to receive a second TLS handshake packet sent by the BRAS, where the second TLS handshake packet carries the URL of the destination server and the certificate of the destination server.

With reference to the fourth aspect or the first possible implementation of the fourth aspect, a third possible implementation of the fourth aspect is further provided, where the receiving module is specifically configured to receive a server redirect packet sent by the BRAS, where the server redirect packet carries the URL of the destination server; and the receiving module is specifically configured to receive a server certificate packet sent by the BRAS, where the server certificate packet carries the certificate of the destination server.

With reference to the fourth aspect, the first possible implementation of the fourth aspect, the second possible implementation of the fourth aspect, or the third possible implementation of the fourth aspect, a fourth possible implementation of the fourth aspect is further provided, where the terminal further includes a redirection module;

the sending module is further configured to send a first HTTPS packet to the BRAS, where the first HTTPS packet is used to request redirection information from the BRAS, and the first HTTPS packet includes the identifier of the terminal;

the receiving module is further configured to receive a second HTTPS packet sent by the BRAS, where the second HTTPS packet includes the URL of the destination server; and the redirection module is further configured to access the destination server according to the URL of the destination server after obtaining an instruction used to instruct that redirection is to be performed.

According to a fifth aspect, a redirection system is provided, including the BRAS provided according to the third aspect or any possible implementation of the third aspect and the terminal provided according to the fourth aspect or any possible implementation of the fourth aspect.

Based on the foregoing technical solutions, in the embodiments of the present application, a BRAS determines whether a first TLS handshake packet of a terminal carries a flag, and after determining that the first TLS handshake packet carries the flag, determines that the terminal corresponding to the flag supports a URL-based redirection function. After determining that the terminal corresponding to the flag supports the URL-based redirection function, the BRAS may send a URL, corresponding to the terminal, of a destination server and a certificate of the destination server to the terminal. The terminal obtains and outputs first prompt information after determining that the URL of the destination server matches the certificate of the destination server. This avoids that the terminal outputs a security alarm page, misleading a user to close the page, when the terminal performs matching between the certificate of the server that redirection is destined for and a URL of a server that the terminal requests to access. Therefore, a redirection success rate is increased.

DESCRIPTION OF EMBODIMENTS

Descriptions are provided by using, as an example, a process in which redirection is implemented by using the Hypertext Transfer Protocol (HTTP).

A terminal, such as a personal computer (PC), sends an access request to a BRAS. A destination address of the access request is an address of a server that the terminal requests to access. The server that the terminal requests to access may not be a web server of an operator. The BRAS may establish, in place of the server that the terminal requests to access, a Transmission Control Protocol (TCP) connection to the terminal. After receiving a GET HTTP packet of the terminal or a POST HTTP packet of the terminal, the BRAS sends a redirect packet to the terminal. The GET HTTP packet is used to request data from a specified resource. The POST HTTP packet is used to submit data to the specified resource. A URL of a destination server carried in the redirect packet is a URL of a web server. The destination server is a server that redirection is destined for.

If the Secure Sockets Layer (SSL) based Hypertext Transfer Protocol Secure (HTTPS) is used between the web server and the terminal, the BRAS may receive a Transport Layer Security (TLS) packet sent by the terminal. The BRAS may complete a TLS handshake with the terminal and receive, after completing the TCP handshake and the TLS handshake, an encrypted GET HTTPS packet or POST HTTPS packet sent by the terminal. The BRAS may send an encrypted redirect packet to the terminal. A certificate sent by the BRAS to the terminal in the process of the TLS handshake with the terminal is a certificate of the web server. That is, the destination server is the web server. In this case, when checking validity of the certificate at a TLS handshake stage, the terminal outputs alarm information because the certificate of the web server does not match a domain name of a website that the terminal requests to access. As a result, the terminal cannot display a correct authentication service page or arrears redirection page, or another related service page.

For the foregoing problem, a solution that helps increase a redirection success rate is proposed. The solution is as follows: A BRAS receives a first TLS handshake packet sent by a terminal, where the first TLS handshake packet carries a flag and an identifier of the terminal, and the flag is used to indicate that the terminal is capable of performing redirection according to a URL; the BRAS obtains a URL of a destination server and a certificate of the destination server according to the identifier of the terminal after determining that the first TLS handshake packet carries the flag, where the destination server is a server that redirection is destined for; and the BRAS sends the URL of the destination server and the certificate of the destination server to the terminal. After determining that the URL of the destination server matches the certificate of the destination server, the terminal may output prompt information used to indicate that redirection is to be performed.

In embodiments of the present application, a server that the terminal requests to access is a first server, and a second server is a server that redirection is destined for. The first server and the second server are different servers. When the terminal meets a redirection condition, a request of the terminal for accessing the first server can be redirected to accessing the second server. The redirection condition may be a web-related service, such as web authentication or arrears notification, provided by an operator. The BRAS may be preconfigured with a URL, corresponding to the terminal, of a second server and a certificate, corresponding to the terminal, of the second server. For example, the BRAS may store a redirection-related entry, where the redirection-related entry includes an identifier of the terminal, the URL of the second server, and the certificate of the second server. The BRAS may obtain the URL of the second server and the identifier of the terminal from an Authentication, Authorization and Accounting (AAA) server. The BRAS may obtain the certificate of the second server from the AAA server or another network device. Alternatively, the BRAS may generate the certificate of the second server according to information used to generate the certificate, provided by the AAA server or another network device. The certificate of the second server may include the URL of the second server. The BRAS may generate or update the redirection-related entry after obtaining the URL of the second server, the certificate of the second server, and the identifier of the terminal.

In the embodiments of the present application, on the BRAS, a corresponding URL of a second server and a certificate of the second server may be configured for a terminal used by a user, according to an authentication domain to which the terminal belongs. For example, web authentication may include a pre-authentication domain and an authentication domain. For a terminal on which web authentication needs to be performed, a URL of a web authentication server may be configured in the pre-authentication domain. The terminal on which web authentication needs to be performed first goes online via the pre-authentication domain. The BRAS redirects HTTP access of the terminal to a web authentication server corresponding to the URL of the web authentication server. If the user inputs a username and a password on a web page that is provided by the web authentication server and displayed on the terminal, the terminal goes online via the authentication domain, and HTTP access of the terminal is not redirected. Alternatively, the AAA server detects that the terminal needs a service with URL redirection, for example, arrears notification, the AAA server sends the URL, corresponding to the terminal, of the second server and the certificate of the second server to the BRAS, and the BRAS performs redirection processing related to the terminal.

The redirection in the embodiments of the present application may be: When the terminal accesses the first server via the BRAS, the BRAS sends the URL of the second server and the certificate of the second server to the terminal after determining that the terminal meets the redirection condition, so that the terminal accesses the second server and completes a service corresponding to the redirection condition.

The terminal in the embodiments of the present application may be a browser or a client installed on a mobile phone, a PC, a mobile terminal, or another device. Other terminal examples are not listed one by one herein.

Figure 1:
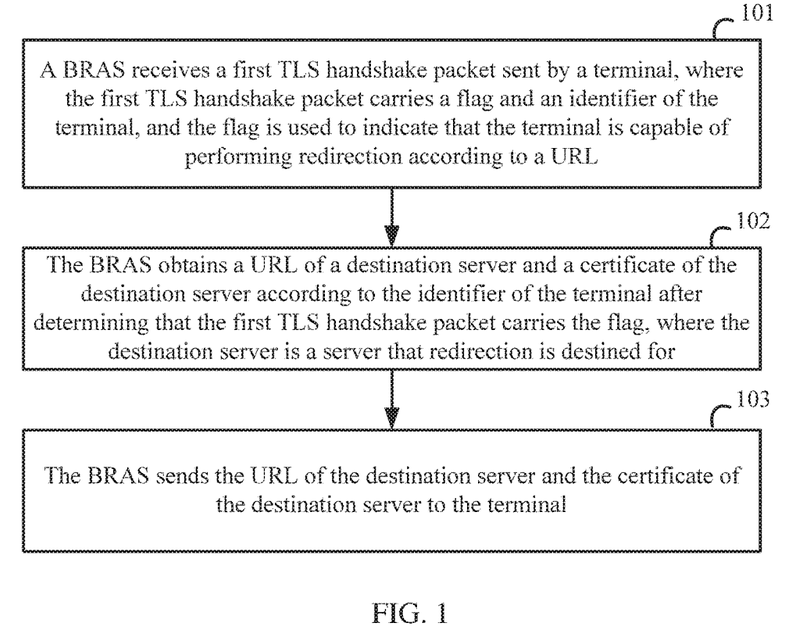
FIG. 1 is a flowchart of a redirection method according to an embodiment of the present application.

In an embodiment corresponding to FIG. 1, a redirection method is described from a BRAS side. As shown in FIG. 1, the redirection method in this embodiment of the present application is as follows.

101: A BRAS receives a first TLS handshake packet sent by a terminal, where the first TLS handshake packet carries a flag and an identifier of the terminal, and the flag is used to indicate that the terminal is capable of performing redirection according to a URL.

For example, that the terminal is capable of performing redirection according to a URL may be that the terminal is capable of parsing a packet that carries the URL and capable of performing redirection by using the URL in the packet. For example, the first TLS handshake packet sent by the terminal to the BRAS carries the flag, and this indicates that the terminal supports an HTTPS redirection function.

For example, the first TLS handshake packet sent by the terminal to the BRAS is client hello. The client hello may include an extension item, and the extension item may be used to carry the flag. Specifically, a payload part of the client hello obtained by the terminal may carry the flag. For example, an extension item is added to a part used for extension in the payload part of the client hello, and the extension item carries the flag.

For example, the identifier of the terminal may be a Media Access Control (MAC) address of the terminal, an Internet Protocol (IP) address of the terminal, or other information used to identify the terminal.

102: The BRAS obtains a URL of a destination server and a certificate of the destination server according to the identifier of the terminal after determining that the first TLS handshake packet carries the flag, where the destination server is a server that redirection is destined for.

For example, the destination server may be a second server. A redirection-related entry may be preconfigured on the BRAS. The redirection-related entry includes the identifier of the terminal, a URL of the second server, and a certificate of the second server. The certificate of the second server may include the URL of the second server.

For example, after determining that the first TLS handshake packet carries the flag, the BRAS determines that the terminal supports redirection. The BRAS may perform local search according to the identifier of the terminal. For example, the BRAS may query whether a redirection-related entry that includes the identifier of the terminal exists. If such a redirection-related entry exists, the BRAS may obtain the URL of the second server and the certificate of the second server from the redirection-related entry. The certificate of the second server may be a certificate for which the second server applies to a certificate authority (CA). A method for generating the certificate of the second server may be a common certificate generation method, and details are not described herein.

For example, the BRAS is configured with a correspondence between the identifier of the terminal and the URL of the second server. The BRAS may generate, or obtain from another network device, the certificate of the second server according to the identifier of the terminal and the URL of the second server corresponding to the identifier of the terminal. The BRAS may obtain the URL of the second server according to the identifier of the terminal carried in the first TLS handshake packet. A manner in which the BRAS generates the certificate of the second server may be a common certificate generation manner, and details are not described herein.

For example, a process in which the BRAS obtains, by means of search according to the identifier of the terminal, the entry corresponding to redirection may be that the BRAS determines that the terminal meets the redirection condition, where a service corresponding to the redirection condition is a service, such as a web authentication service or an arrears notification service, provided by the second server.

103: The BRAS sends the URL of the destination server and the certificate of the destination server to the terminal.

For example, the BRAS may send the certificate of the second server at the same time when sending the URL of the second server to the terminal. For example, the BRAS sends a second TLS handshake packet to the terminal, where the second TLS handshake packet may be a server hello packet, and the server hello carries the URL of the second server and the certificate of the second server. Alternatively, the BRAS may send the certificate of the second server to the terminal after sending the URL of the second server to the terminal. For example, the BRAS sends a server redirect packet that carries the URL of the second server to the terminal, and then sends a server certificate packet that carries the certificate of the second server to the terminal.

For compatibility with a common redirection process, after 103, the method provided in this embodiment of the present application may further include: receiving, by the BRAS, a first HTTPS packet sent by the terminal, where the first HTTPS packet is used to request redirection information from the BRAS, the first HTTPS packet may be a GET HTTPS packet or a POST HTTPS packet, and the first HTTPS packet includes the identifier of the terminal; and sending, by the BRAS, a second HTTPS packet to the terminal, where the second HTTPS packet may carry the redirection information, the redirection information may include the URL of the second server, and the second HTTPS packet may be a Redirect HTTPS packet. After ending the TLS handshake with the terminal, the BRAS may send the redirection information to the terminal by using the second HTTPS packet. This helps the terminal access the second server according to the redirection information.

For example, alternatively, the terminal may access, after the TLS handshake with the BRAS, the second server according to the URL of the second server obtained from the BRAS during the TLS handshake, without a process of sending the first HTTPS packet to the BRAS.

For example, if the service provided by the second server is a web authentication service, the redirection information in the second HTTPS packet may further include information used to complete web authentication. The information used to complete web authentication may include a MAC address of a user, physical location information of the user, and the like. The terminal may access the second server according to the redirection information, and send the information used to complete web authentication to the second server. This helps the second server perform web authentication on the terminal according to the information used to complete web authentication.

In this embodiment, a BRAS determines whether a first TLS handshake packet sent by a terminal carries a flag, where the flag is used to indicate that the terminal is capable of performing redirection according to a URL; after determining that the first TLS handshake packet carries the flag, the BRAS sends a URL, corresponding to the terminal, of a destination server and a certificate, corresponding to the terminal, of the destination server to the terminal. This helps increase a success rate of matching performed by the terminal between the URL of the destination server and the certificate of the destination server, and helps increase a redirection success rate.

Figure 2:
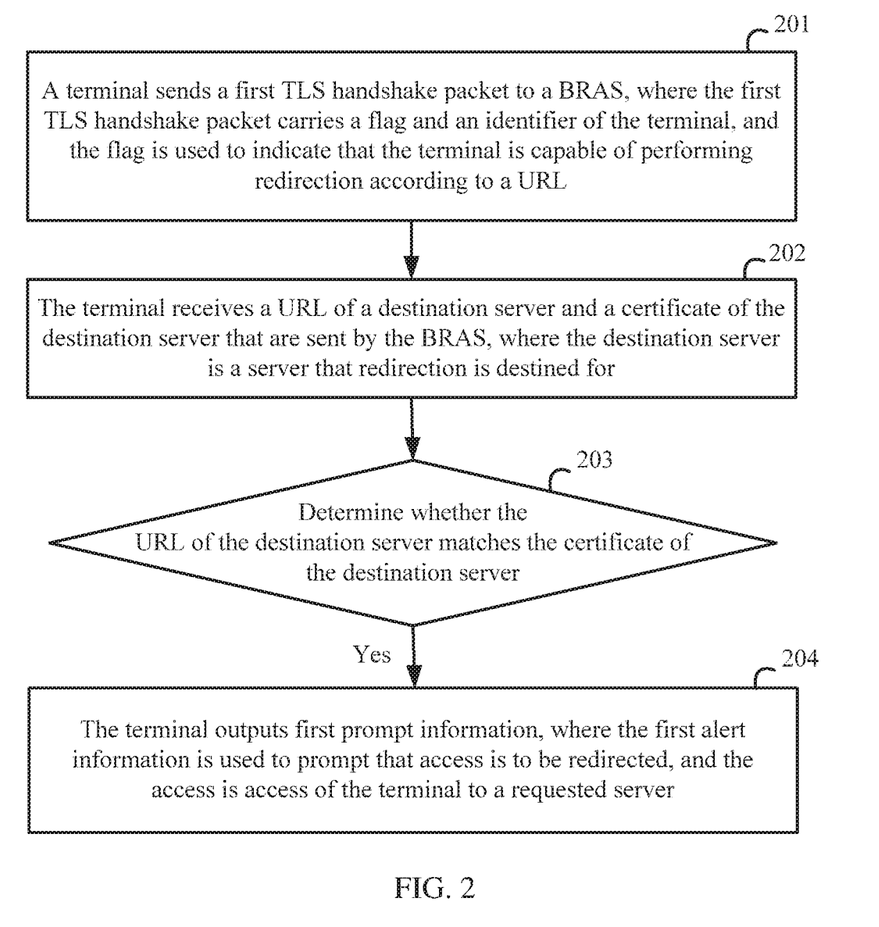
FIG. 2 is a flowchart of a redirection method according to an embodiment of the present application.

In an embodiment corresponding to FIG. 2, a redirection method is described from a terminal side. As shown in FIG. 2, the redirection method in this embodiment of the present application is as follows.

201: A terminal sends a first TLS handshake packet to a BRAS, where the first TLS handshake packet carries a flag and an identifier of the terminal, and the flag is used to indicate that the terminal is capable of performing redirection according to a URL.

For example, that the terminal is capable of performing redirection according to a URL may be that the terminal is capable of parsing a packet that carries the URL and capable of performing redirection by using the URL in the packet. For example, that the first TLS handshake packet sent by the terminal to the BRAS carries the flag may indicate that the terminal supports an HTTPS redirection function. The identifier of the terminal in this embodiment of the present application may be the same as the identifier of the terminal in the embodiment corresponding to FIG. 1, and details are not repeated herein. The first TLS handshake packet in this embodiment of the present application may be the same as the first TLS handshake packet in the embodiment corresponding to FIG. 1, and details are not repeated herein.

For example, the terminal sends the first TLS handshake packet to the BRAS in order to request to access a first server.

202: The terminal receives a URL of a destination server and a certificate of the destination server that are sent by the BRAS, where the destination server is a server that redirection is destined for.

For example, the destination server may be a second server. The URL of the second server and the certificate of the second server may be corresponding content in the embodiment corresponding to FIG. 1, and details are not repeated herein.

For example, that the terminal receives a URL of a destination server and a certificate of the destination server that are sent by the BRAS includes: the terminal receives a server redirect packet sent by the BRAS, where the server redirect packet carries the URL of the second server; the terminal obtains the URL of the second server from the server redirect packet; the terminal receives a server certificate packet sent by the BRAS, where the server certificate packet carries the certificate of the second server; and the terminal obtains the certificate of the second server from the server certificate packet.

For example, that the terminal receives a URL of a destination server and a certificate of the destination server that are sent by the BRAS includes: the terminal receives a second TLS handshake packet sent by the BRAS, where the second TLS handshake packet is a server hello packet, and the server hello packet carries the URL of the second server and the certificate of the second server; and the terminal obtains the URL of the second server and the certificate of the second server from the server hello packet.

203: The terminal determines whether the URL of the destination server matches the certificate of the destination server, and performs 204 if the URL of the destination server matches the certificate of the destination server.

For example, the certificate of the second server carries at least the URL of the second server. If the URL of the second server carried in the certificate of the second server is the same as the URL of the second server received by the terminal, the terminal determines that the certificate of the second server matches the URL of the second server. If the URL of the second server carried in the certificate of the second server is different from the URL of the second server received by the terminal, the terminal determines that the certificate of the second server does not match the URL of the second server.

204: The terminal outputs first prompt information, where the first prompt information is used to prompt that access is to be redirected, and the access is access of the terminal to a requested server.

For example, the server that the terminal requests to access is a first server. The access is access to the first server.

For example, if the terminal determines that the URL of the second server matches the certificate of the second server, the terminal may generate the first prompt information. The terminal may output the first prompt information to a user. A manner in which the terminal outputs the first prompt information to the user includes: the terminal generates a page that includes the first prompt information, and the terminal displays the page that includes the first prompt information.

After 203, the method provided in this embodiment of the present application further includes: outputting, by the terminal, second prompt information if the URL of the destination server does not match the certificate of the destination server, where the second prompt information is used to prompt that the certificate of the destination server is incorrect.

For example, if the terminal determines that the URL of the second server does not match the certificate of the second server, the terminal may generate the second prompt information. The terminal may output the second prompt information to a user. A manner in which the terminal outputs the second prompt information to the user includes: the terminal generates a page that includes the second prompt information, and the terminal displays the page that includes the second prompt information.

After 204, the method provided in this embodiment of the present application further includes: completing, by the terminal, the TLS handshake process with the BRAS after obtaining an instruction that is input by the user according to the first prompt information, where the instruction that is input by the user is used to confirm continuing to access the URL of the second server; sending, by the terminal, a first HTTPS packet to the BRAS after the TLS handshake process, where the first HTTPS packet is used to request redirection information from the BRAS, and the first HTTPS packet includes the identifier of the terminal; receiving, by the terminal, a second HTTPS packet sent by the BRAS, where the second HTTPS packet includes the redirection information, and the redirection information includes the URL of the second server; and accessing, by the terminal according to the redirection information, a server corresponding to the URL of the second server.

After 204, the method provided in this embodiment of the present application further includes: ending, by the terminal, the TLS handshake process with the BRAS after obtaining an instruction that is input by the user according to the first prompt information, where the instruction is used to confirm continuing to access the URL of the second server; sending, by the terminal, a first HTTPS packet to the BRAS; receiving, by the terminal, a second HTTPS packet sent by the BRAS; and accessing, by the terminal according to the redirection information, a server corresponding to the URL of the second server.

For example, the method provided in this embodiment of the present application further includes: ending, by the terminal, redirection if the terminal does not receive the second HTTPS packet sent by the BRAS.

In this embodiment, a terminal adds a flag to a first TLS handshake packet that is to be sent to a BRAS, so that the BRAS determines, according to the flag, that the terminal is capable of performing redirection according to a URL; the terminal receives a certificate of a destination server and a URL of the destination server that are sent by the BRAS, and performs matching between the certificate of the destination server and the URL of the destination server. This avoids a redirection failure that occurs because the certificate of the destination server does not match a URL of a server that the terminal requests to access, when the terminal checks validity of the certificate of the destination server, and helps increase a redirection success rate.

The following describes an HTTPS redirection process in the embodiments of the present application in detail by using two embodiments.

Figure 3:
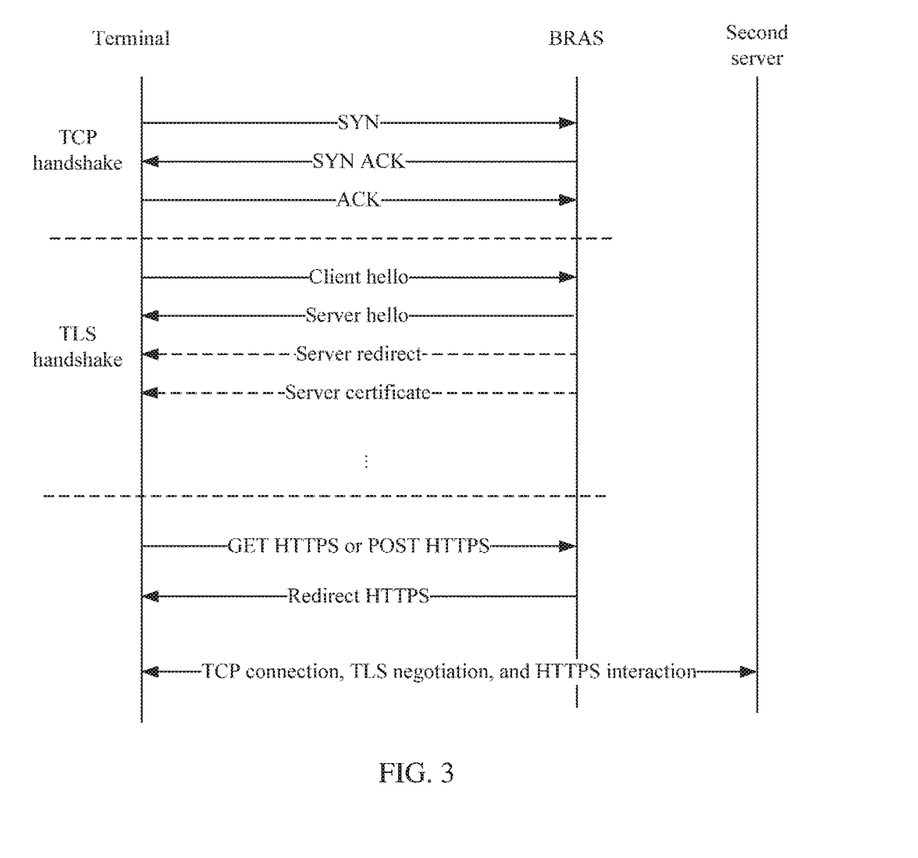
FIG. 3 is a schematic diagram of an HTTPS redirection process according to an embodiment of the present application.

An HTTPS redirection process provided in a first embodiment is shown in FIG. 3.

A terminal, such as a browser installed on a terminal, adds an extension item named redirect_url_enable and an identifier of the terminal to a generated client hello packet. Content of the extension item is used to indicate that the terminal is capable of parsing a packet that carries a URL and capable of performing redirection by using the URL in the packet.

After receiving the client hello packet of the terminal, a BRAS sends a server hello packet to the terminal if the BRAS determines that the client hello packet carries the extension item named redirect_url_enable, where the server hello is used for the BRAS and the terminal to negotiate an encryption manner and other information. The BRAS obtains a URL, corresponding to the terminal, of a second server and a certificate of the second server according to the identifier of the terminal carried in the client hello packet. The BRAS sends a server redirect packet to the terminal, where the server redirect packet carries the URL of the second server. The BRAS sends a server certificate packet to the terminal, where the server certificate packet includes the certificate of the second server.

The terminal receives the server redirect packet sent by the BRAS, and obtains the URL of the second server from the server redirect packet. The terminal receives the server certificate packet sent by the BRAS, and obtains the certificate of the second server from the server certificate packet. The terminal determines whether the certificate of the second server matches the URL of the second server. If the certificate of the second server matches the URL of the second server, the terminal generates and outputs a first prompt page, where the first prompt page is used to prompt that access is to be redirected to the second server. If the certificate of the second server does not match the URL of the second server, the terminal generates and outputs a second prompt page, where the second prompt page is an alarm page used to prompt that the certificate is incorrect.

If the terminal obtains an instruction to access the second server from a user, the terminal sends a GET HTTPS packet or a POST HTTPS packet to the BRAS after completing the TLS handshake interaction with the BRAS. The GET HTTPS packet or the POST HTTPS packet may carry the identifier of the terminal.

The BRAS sends a Redirect HTTPS packet to the terminal according to the obtained identifier of the terminal after completing the TLS handshake interaction with the terminal and receiving the GRT HTTPS packet or the POST HTTPS packet, where the Redirect HTTPS packet carries at least the URL of the second server.

If the terminal receives the Redirect HTTPS packet, the terminal starts a process of accessing the second server, that is, accessing the second server according to the URL of the second server in the Redirect HTTPS packet. If the terminal does not receive the Redirect HTTPS packet or the URL carried in the Redirect HTTPS packet is different from the URL carried in the server redirect packet, the terminal does not access the second server.

Figure 4:
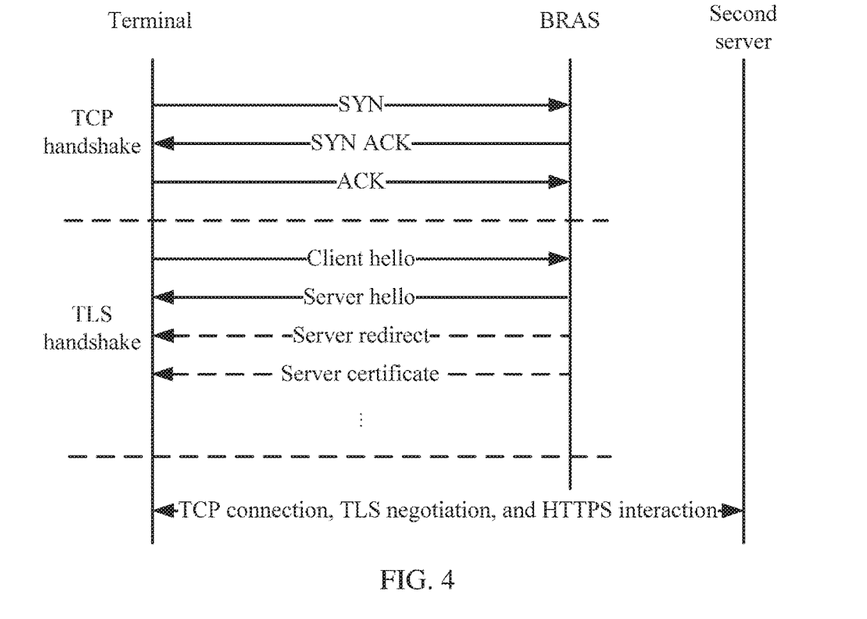
FIG. 4 is a schematic diagram of another HTTPS redirection process according to an embodiment of the present application.

An HTTPS redirection process in a second specific embodiment is shown in FIG. 4. A difference from the first specific embodiment is as follows:

After obtaining the instruction to access the second server from the user, the terminal ends the TLS handshake process with the BRAS, and the terminal does not send a GET HTTPS packet or a POST HTTPS packet to the BRAS. The terminal may access the second server by using the URL of the second server that is obtained from the BRAS in the TLS handshake process.

In the foregoing two specific embodiments, the extension item named redirect_url_enable in the client hello packet may be expressed as:

```
enum{
    redirect_url_enable
}Extension Type;
``` where redirect_url_enable may be used as a flag and carries no data.

In the foregoing two specific embodiments, the URL of the second server may be carried in a payload of the server redirect packet. A structure of the server redirect packet may be expressed as:

```
struct{
    unit8 urllength;
    opaque string<0-255>;
}Server Redirect.
``` where the unit8 urllength may carry a length of the URL of the second server, and the opaque string may carry the URL of the second server.

Figure 5:
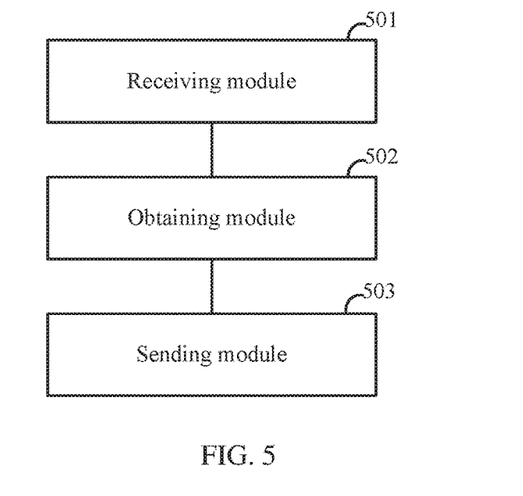
FIG. 5 is a schematic structural diagram of a BRAS according to an embodiment of the present application.

An embodiment of the present application further provides a BRAS. The BRAS may use the method used by the BRAS in the foregoing method embodiments, and repetition is omitted herein. As shown in FIG. 5, the BRAS includes:

a receiving module 501, configured to receive a first TLS handshake packet of a terminal, where the first TLS handshake packet carries a flag and an identifier of the terminal, and the flag is used to indicate that the terminal is capable of performing redirection according to a URL, and that the terminal is capable of performing redirection according to a URL may be that the terminal is capable of parsing a packet that carries the URL and capable of performing redirection by using the URL in the packet;

an obtaining module 502, configured to obtain a URL of a destination server and a certificate of the destination server according to the identifier of the terminal after it is determined that the first TLS handshake packet carries the flag, where the destination server is a server that redirection is destined for, and the destination server may be the second server in the embodiment corresponding to FIG. 1, FIG. 2, FIG. 3, or FIG. 4; and a sending module 503, configured to send the URL of the destination server and the certificate of the destination server to the terminal.

For example, the sending module 503 is specifically configured to send a server redirect packet that carries the URL of the destination server to the terminal, and the sending module is specifically configured to send a server certificate packet that carries the certificate of the destination server to the terminal.

For example, the sending module 503 is specifically configured to send a second TLS handshake packet to the terminal, where the second TLS handshake packet is a server hello packet, and the server hello packet carries the URL of the destination server and the certificate of the destination server.

In this embodiment, a BRAS determines whether a first TLS handshake packet sent by a terminal carries a flag, where the flag is used to indicate that the terminal is capable of performing redirection according to a URL; after determining that the first TLS handshake packet carries the flag, the BRAS sends a URL, corresponding to the terminal, of a destination server and a certificate, corresponding to the terminal, of the destination server to the terminal. This helps increase a success rate of matching performed by the terminal between the URL of the destination server and the certificate of the destination server, and helps increase a redirection success rate.

Figure 6:
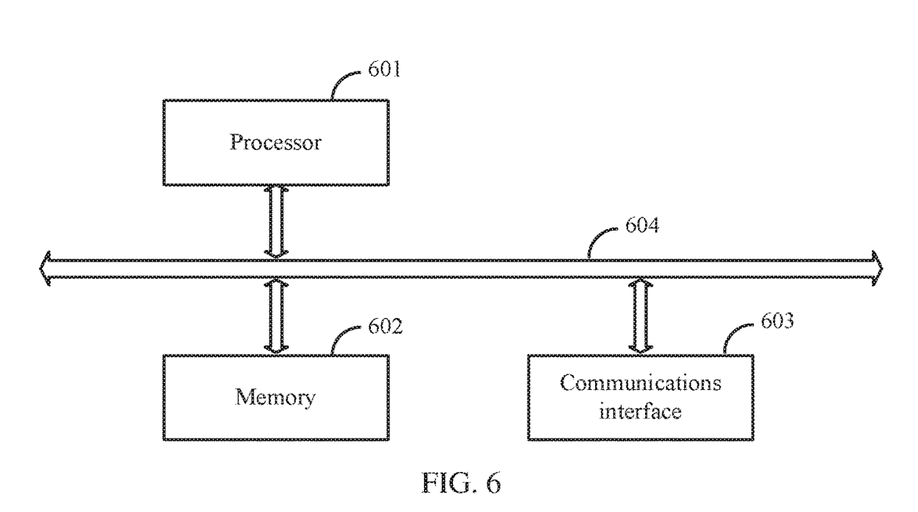
FIG. 6 is a schematic structural diagram of another BRAS according to an embodiment of the present application.

An embodiment of the present application further provides a BRAS. The BRAS may use the method used by the BRAS in the foregoing method embodiments, and repetition is omitted herein. As shown in FIG. 6, the BRAS includes a processor 601, a memory 602, and a communications interface 603. The processor 601, the memory 602, and the communications interface 603 are connected to each other by using a bus 604. The bus 604 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For convenience of denotation, the bus is represented by one bold line in FIG. 6. However, this does not indicate that there is only one bus or one type of bus.

The memory 602 is configured to store a program. Specifically, the program may include program code, where the program code includes a computer operation instruction. The memory 602 may include a random access memory (random access memory, RAM for short), and may further include a non-volatile memory (non-volatile memory), for example, at least one magnetic disk memory.

The communications interface 603 is configured for communication with another device.

The processor 601 obtains the program in the memory 602, and executes the following process according to the program:

receiving a first TLS handshake packet of a terminal by using the communications interface 603, where the first TLS handshake packet carries a flag and an identifier of the terminal, and the flag is used to indicate that the terminal is capable of performing redirection according to a URL;

obtaining a URL of a destination server and a certificate of the destination server according to the identifier of the terminal after determining that the first TLS handshake packet carries the flag, where the destination server is a server that redirection is destined for; and sending the URL of the destination server and the certificate of the destination server to the terminal by using the communications interface 603.

For example, that the terminal is capable of performing redirection according to a URL may be that the terminal is capable of parsing a packet that carries the URL and capable of performing redirection by using the URL in the packet.

For example, by using the communications interface 603, the processor 601 sends a server redirect packet that carries the URL of the destination server to the terminal, and sends a server certificate packet that carries the certificate of the destination server to the terminal.

For example, the processor 601 sends a second TLS handshake packet to the terminal by using the communications interface 603, where the second TLS handshake packet is a server hello packet, and the server hello packet carries the URL of the destination server and the certificate of the destination server.

In this embodiment, a BRAS determines whether a first TLS handshake packet sent by a terminal carries a flag, where the flag is used to indicate that the terminal is capable of performing redirection according to a URL; after determining that the first TLS handshake packet carries the flag, the BRAS sends a URL, corresponding to the terminal, of a destination server and a certificate, corresponding to the terminal, of the destination server to the terminal. This helps increase a success rate of matching performed by the terminal between the URL of the destination server and the certificate of the destination server, and helps increase a redirection success rate.

Figure 7:
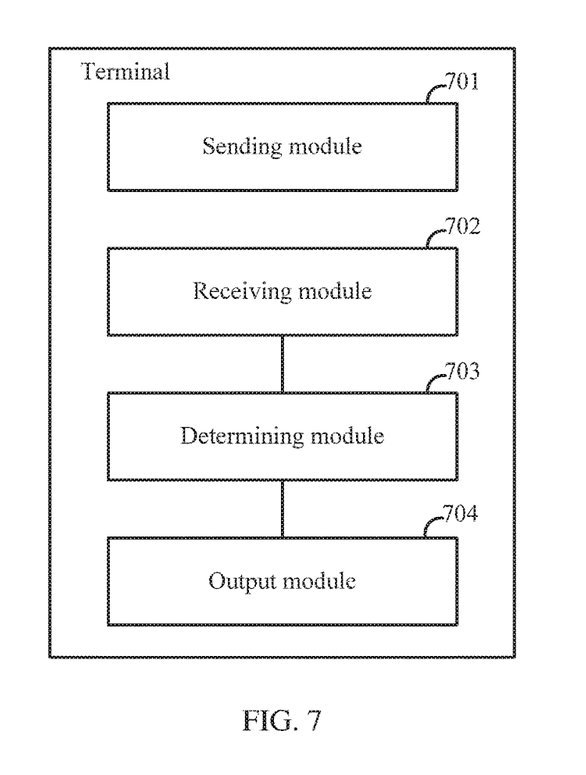
FIG. 7 is a schematic structural diagram of a terminal according to an embodiment of the present application.

An embodiment of the present application further provides a terminal. The terminal may use the method used by the terminal in the foregoing method embodiments, and repetition is omitted herein. As shown in FIG. 7, the terminal includes:

a sending module 701, configured to send a first TLS handshake packet to a BRAS, where the first TLS handshake packet carries a flag and an identifier of the terminal, and the flag is used to indicate that the terminal is capable of performing redirection according to a URL, and that the terminal is capable of performing redirection according to a URL may be that the terminal is capable of parsing a packet that carries the URL and capable of performing redirection by using the URL in the packet;

a receiving module 702, configured to receive a URL of a destination server and a certificate of the destination server that are returned by the BRAS, where the destination server is a server that redirection is destined for;

a determining module 703, configured to determine whether the URL of the destination server matches the certificate of the destination server; and an output module 704, configured to output first prompt information if the determining module 703 determines that the URL of the destination server matches the certificate of the destination server, where the first prompt information is used to prompt that access to a requested server is to be redirected.

Optionally, the output module 704 is further configured to output second prompt information if the determining module 703 determines that the URL of the destination server does not match the certificate of the destination server, where the second prompt information is used to prompt that the certificate of the target server is incorrect.

For example, the receiving module 702 is specifically configured to receive a second TLS handshake packet sent by the BRAS, where the second TLS handshake packet carries the URL of the destination server and the certificate of the destination server. The receiving module 702 may obtain the URL of the destination server and the certificate of the destination server from the second TLS handshake packet, or the determining module 703 may obtain the URL of the destination server and the certificate of the destination server from the second TLS handshake packet received by the receiving module 702.

For example, the receiving module 702 is specifically configured to receive a server redirect packet sent by the BRAS, where the server redirect packet carries the URL of the destination server, and receive a server certificate packet sent by the BRAS, where the server certificate packet carries the certificate of the destination server. The receiving module 702 or the determining module 703 may obtain the URL of the destination server from the server redirect packet, and the receiving module 702 or the determining module 703 may obtain the certificate of the destination server from the server certificate packet.

In this embodiment, a terminal adds a flag to a first TLS handshake packet that is to be sent to a BRAS, so that the BRAS determines, according to the flag, that the terminal is capable of performing redirection according to a URL; the terminal receives a certificate of a destination server and a URL of the destination server that are sent by the BRAS, and performs matching between the certificate of the destination server and the URL of the destination server. This avoids a redirection failure that occurs because the certificate of the destination server does not match a URL of a server that the terminal requests to access, when the terminal checks validity of the certificate of the destination server, and helps increase a redirection success rate.

Figure 8:
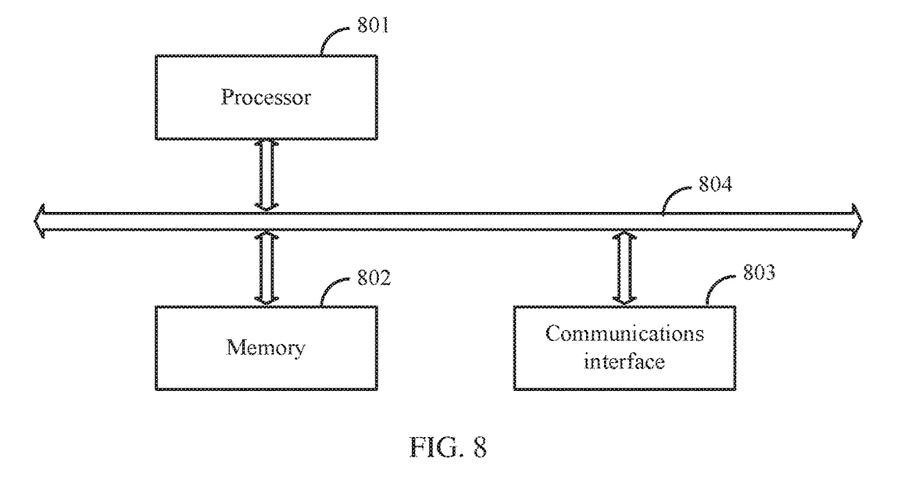
FIG. 8 is a schematic structural diagram of another terminal according to an embodiment of the present application.

An embodiment of the present application further provides a terminal. The terminal may use the method used by the terminal in the foregoing method embodiments, and repetition is omitted herein. As shown in FIG. 8, the terminal includes a processor 801, a memory 802, and a communications interface 803. The processor 801, the memory 802, and the communications interface 803 are connected to each other by using a bus 804. The bus 804 may be a peripheral component interconnect (PCI) bus, an extended industry standard architecture (EISA) bus, or the like. The bus may be classified into an address bus, a data bus, a control bus, and the like. For convenience of denotation, the bus is represented by one bold line in FIG. 8. However, this does not indicate that there is only one bus or one type of bus.

The memory 802 is configured to store a program. Specifically, the program may include program code, where program code includes a computer operation instruction. The memory 802 may include a random access memory (RAM), and may further include a non-volatile memory, for example, at least one magnetic disk memory.

The communications interface 803 is configured for communication with another device.

The processor 801 is configured to obtain the program in the memory 802, and executes the following process according to the program:

sending a first TLS handshake packet to a BRAS by using the communications interface 803, where the first TLS handshake packet carries a flag and an identifier of the terminal, and the flag is used to indicate that the terminal is capable of performing redirection according to a URL;

receiving, by using the communications interface 803, a URL of a destination server and a certificate of the destination server that are sent by the BRAS, where the destination server is a server that redirection is destined for; and determining whether the URL of the destination server matches the certificate of the destination server, and outputting first prompt information after determining that the URL of the destination server matches the certificate of the destination server, where the first prompt information is used to prompt that access to a requested server is to be redirected.

Optionally, the processor 801 outputs second prompt information if the processor 801 determines that the URL of the destination server does not match the certificate of the destination server, where the second prompt information is used to prompt that the certificate of the target server is incorrect.

For example, after obtaining an instruction that is input by a user according to the first prompt information, the processor 801 sends a first HTTPS packet to the BRAS by using the communications interface 803, where the instruction is used to confirm continuing to access the URL of the destination server, the first HTTPS packet carries the identifier of the terminal, and the first HTTPS packet is used to request redirection information from the BRAS. The processor 801 receives, by using the communications interface 803, a second HTTPS packet sent by the BRAS, where the second HTTPS packet carries the redirection information. If the processor 801 successfully receives, by using the communications interface 803, the second HTTPS packet sent by the BRAS, the processor 801 accesses, according to the redirection information, a server corresponding to the URL of the destination server. If the processor 801 does not receive, by using the communications interface 803, the second HTTPS packet sent by the BRAS, the terminal does not access the destination server.

Optionally, the processor 801 may end the TLS handshake process with the BRAS before sending the first HTTPS packet to the BRAS by using the communications interface 803.

For example, the processor 801 receives, by using the communications interface 803, a second TLS handshake packet sent by the BRAS, where the second TLS handshake packet carries the URL of the destination server and the certificate of the destination server.

For example, by using the communications interface 803, the processor 801 receives a server redirect packet sent by the BRAS, where the server redirect packet carries the URL of the destination server, and receives a server certificate packet sent by the BRAS, where the server certificate packet carries the certificate of the destination server.

In this embodiment, a terminal adds a flag to a first TLS handshake packet that is to be sent to a BRAS, so that the BRAS determines, according to the flag, that the terminal is capable of performing redirection according to a URL; the terminal receives a certificate of a destination server and a URL of the destination server that are sent by the BRAS, and performs matching between the certificate of the destination server and the URL of the destination server. This avoids a redirection failure that occurs because the certificate of the destination server does not match a URL of a server that the terminal requests to access, when the terminal checks validity of the certificate of the destination server, and helps increase a redirection success rate.

Figure 9:
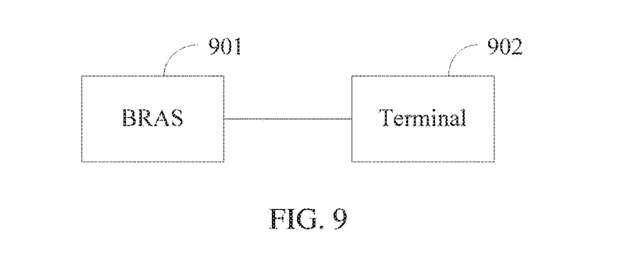
FIG. 9 is a schematic diagram of a redirection system according to an embodiment of the present application.

FIG. 9 is a schematic diagram of a redirection system according to an embodiment of the present application. The system shown in FIG. 9 may include a BRAS 901 and a terminal 902. The BRAS may be the BRAS provided in the embodiment corresponding to FIG. 5 or FIG. 6, and details are not repeated herein. The terminal may be the terminal provided in the embodiment corresponding to FIG. 7 or FIG. 8, and details are not repeated herein.

A person skilled in the art should understand that the embodiments of the present application may be provided as a method, a system, or a computer program product. Therefore, the present application may use a form of hardware-only embodiments, software-only embodiments, or embodiments with a combination of software and hardware. Moreover, the present application may use a form of a computer program product that is implemented on one or more computer-usable storage media (including but not limited to a magnetic disk memory, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Apparently, a person skilled in the art may make various modifications and variations to the present application without departing from the spirit and scope of the present application. The present application is intended to cover these modifications and variations provided that they fall within the scope of protection defined by the following claims and their equivalent technologies.

What is claimed is:

1. A redirection method, comprising:
   receiving, by a broadband remote access server (BRAS), a first Transport Layer Security (TLS) handshake packet sent by a terminal, wherein the first TLS handshake packet indicates the terminal to request to access a first server, the first TLS handshake packet carries a flag and an identifier of the terminal, and the flag is used to indicate that the terminal is capable of performing redirection according to a uniform resource locator (URL) in a TLS handshake process;

obtaining, by the BRAS, a URL of a second server and a certificate of the second server according to the identifier of the terminal after determining that the first TLS handshake packet carries the flag, wherein the second server is a server that redirection is destined for, wherein the first server and the second server are different servers;

sending, by the BRAS, an encrypted server redirect packet to the terminal, wherein the encrypted server redirect packet carries the URL of the second server; and sending, by the BRAS, a server certificate packet to the terminal, wherein the server certificate packet carries the certificate of the second server to enable the terminal to access the second server and complete a service corresponding to a redirection condition in response to completing the first TLS handshake.

2. The method according to claim 1, wherein obtaining, by the BRAS, a URL of a second server and a certificate of the second server according to the identifier of the terminal comprises:

obtaining, by the BRAS, a preconfigured entry according to the identifier of the terminal, wherein the preconfigured entry comprises the identifier of the terminal, the URL of the second server, and the certificate of the second server; and obtaining, by the BRAS, the URL of the second server and the certificate of the second server from the entry.

3. The method according to claim 1, wherein sending, by the BRAS, the encrypted server redirect packet and the server certificate packet to the terminal comprises:

sending, by the BRAS, a second TLS handshake packet to the terminal, wherein the second TLS handshake packet carries the URL of the second server and the certificate of the second server.

4. A redirection method, comprising:

sending, by a terminal, a first Transport Layer Security (TLS) handshake packet to a broadband remote access server (BRAS), wherein the first TLS handshake packet indicates the terminal to request to access a first server, the first TLS handshake packet carries a flag and an identifier of the terminal, and the flag is used to indicate that the terminal is capable of performing redirection according to a uniform resource locator (URL) in a TLS handshake process;

receiving, by the terminal, an encrypted server redirect packet sent by the BRAS, wherein the encrypted server redirect packet carries a URL of a second server;

obtaining, by the terminal, the URL of the second server from the encrypted server redirect packet;

receiving, by the terminal, a server certificate packet sent by the BRAS, wherein the server certificate packet carries a certificate of the second server;

obtaining, by the terminal, the certificate of the second server from the server certificate packet, wherein the second server is a server that redirection is destined for, wherein the first server and the second server are different servers;

determining, by the terminal, whether the URL of the second server matches the certificate of the second server; and outputting, by the terminal, first prompt information if the URL of the second server matches the certificate of the second server, wherein the first prompt information is used to prompt that access is to be redirected, and the access is access of the terminal to a requested server to complete a service corresponding to a redirection condition in response to completing the first TLS handshake.

5. The method according to claim 4, further comprising:

outputting, by the terminal, second prompt information if the URL of the second server does not match the certificate of the second server, wherein the second prompt information is used to indicate that the certificate of the second server is incorrect.

6. The method according to claim 4, wherein receiving, by the terminal, the encrypted server redirect packet and the server certificate packet that are sent by the BRAS comprises:

receiving, by the terminal, a second TLS handshake packet sent by the BRAS, wherein the second TLS handshake packet carries the URL of the second server and the certificate of the second server; and obtaining, by the terminal, the URL of the second server and the certificate of the second server from the second TLS handshake packet.

7. A broadband remote access server (BRAS), comprising: a memory storing instructions; and a processor coupled to the memory, wherein the instructions, when executed by the processor, cause the processor to:

receive a first Transport Layer Security (TLS) handshake packet sent by a terminal, wherein the first TLS handshake packet indicates the terminal to request to access a first server, the first TLS handshake packet carries a flag and an identifier of the terminal, and the flag is used to indicate that the terminal is capable of performing redirection according to a uniform resource locator (URL) in a TLS handshake process;

obtain a URL of a second server and a certificate of the second server according to the identifier of the terminal after it is determined that the first TLS handshake packet carries the flag, wherein the second server is a server that redirection is destined for, the first server and the second server are different servers;

send an encrypted server redirect packet to the terminal, wherein the encrypted server redirect packet carries the URL of the second server; and send a server certificate packet to the terminal, wherein the server certificate packet carries the certificate of the second server to enable the terminal to access the second server and complete a service corresponding to a redirection condition in response to completing the first TLS handshake.

8. The BRAS according to claim 7, wherein the instructions, when executed by the processor, further cause the processor to:

obtain a preconfigured entry according to the identifier of the terminal, wherein the entry comprises the identifier of the terminal, the URL of the second server, and the certificate of the second server; and obtain the URL of the second server and the certificate of the second server from the entry.

9. The BRAS according to claim 7, wherein the instructions, when executed by the processor, cause the processor to send the encrypted server redirect packet and the server certificate packet to the terminal, further cause the processor to:

send a second TLS handshake packet to the terminal, wherein the second TLS handshake packet carries the URL of the second server and the certificate of the second server.

* * * * *